J. Willis,
Umbrella.
No. 112,307.
2 Sheets, Sheet 1.
Patented Feb. 28, 1871.
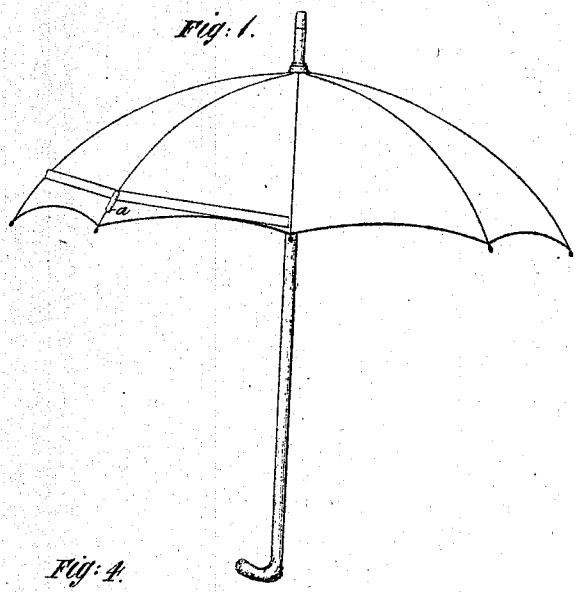
Fig. 1.
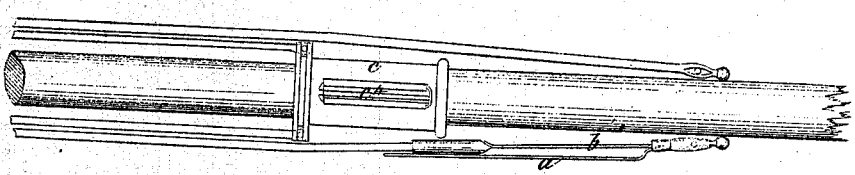
Fig. 4.
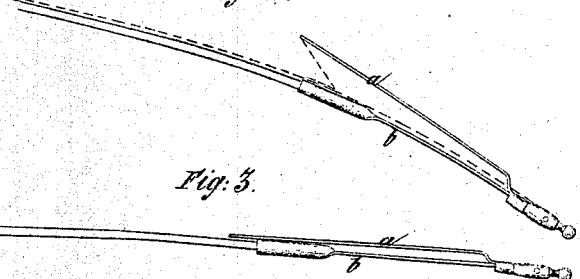
Fig. 2.
Fig. 3.
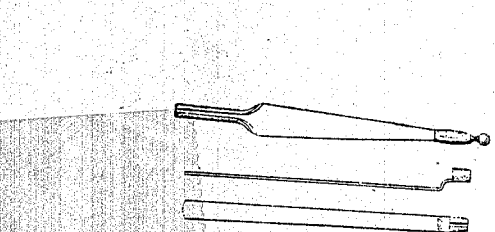
Witnesses
Geo. Pitt
H. Carpmael
James Willis
24 Southampton Building
London

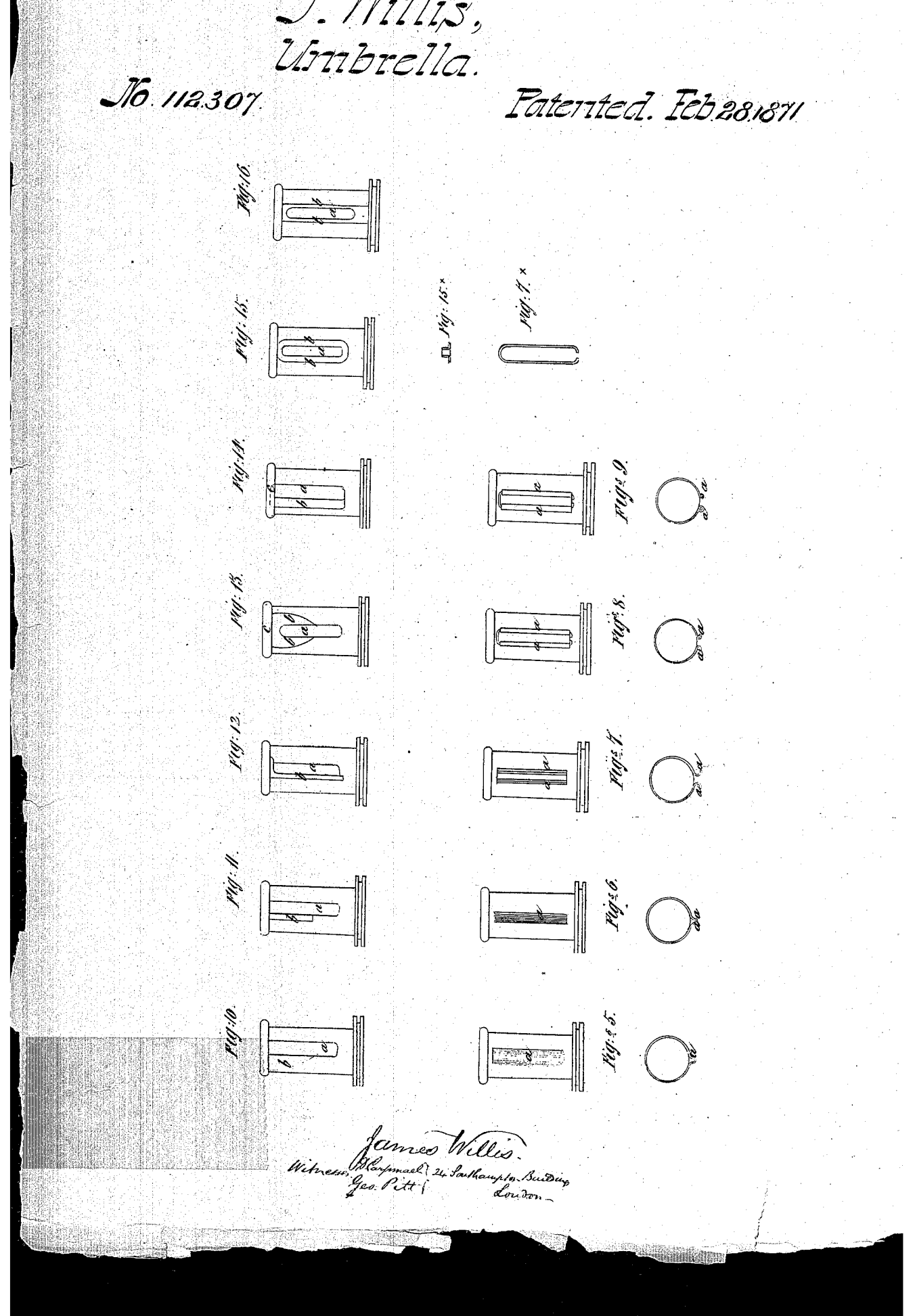

J. Willis,
Umbrella.

No. 112,307.  Patented. Feb. 28, 1871.

2 Sheets, Sheet 2.

James Willis.
Witness:
Geo. Pitt

United States Patent Office.

JAMES WILLIS, OF STOCKSBRIDGE WORKS, NEAR SHEFFIELD, ENGLAND.

Letters Patent No. 112,307, dated February 28, 1871.

IMPROVEMENT IN UMBRELLAS.

The Schedule referred to in these Letters Patent and making part of the same.

*To whom it may concern:*

Be it known that I, JAMES WILLIS, of Stocksbridge Works, near Sheffield, in the county of York, England, a subject of the Queen of Great Britain, have invented or discovered new and useful "Improvements in the Manufacture of Sunshades and Umbrellas;" and I, the said JAMES WILLIS, do hereby declare the nature of said invention, and in what manner the same is to be performed, to be particularly described and ascertained in and by the following statement thereof, that is to say—

This invention has, first, for its object an improved mode of constructing umbrellas with a gutter running either entirely or partially around the covering, and relates to an improved mode of opening and holding open the gutter when the umbrella is opened.

For this purpose I affix to or form on the ribs a strip of metal, of any suitable section, leading backward along the rib, and connected at its end to the fabric of which the gutter is composed.

By this means, when the umbrella is set up and the ribs have consequently a downward curve given to them at their tip ends, the strip of metal will tend to stand out away from the rib, and so hold open the gutter, while, when the umbrella is closed, the springs or strips of metal may lie close to the ribs; and in order, also, that the tip ends of the ribs may lie close up to the stick when the umbrella is closed, I prefer to construct the ribs with a permanent inward bend near their tip ends. I also strengthen the runners of umbrellas and sunshades around the sides, or a portion of the sides of their longitudinal slot, as hereinafter more fully described.

Figure 1 shows a side view of an umbrella fitted with a gutter in the manner above described.

The gutter is shown to pass round one-half of the circumference of the umbrella, and to be higher in the center than at its two ends, where any rain collecting in the gutter is run off. This, however, may be varied, and the gutter, if desired, may be made to pass all around the circumference of the umbrella at a uniform level, and any rain collecting in the gutter may be emptied therefrom by slightly inclining the umbrella.

The gutter I prefer to form of a narrow ribbon, say about three-quarters of an inch or one inch wide. One edge of this ribbon I double over and attach by stitching and cement to the fabric which forms the covering of the umbrella, and in order to open and hold open the gutter when the umbrella is open I attach to the ribs, as above stated, strips of metal marked $a$, by preference leading backward along the ribs, and connected at their ends to the strip of fabric which forms the gutter.

By this means, when a curvature is given to the ribs by the opening of the umbrella, the ends of the strips of metal $a$ stand out away from the ribs and hold the gutter open.

Various ways of so attaching strips of metal to the ribs of an umbrella for the purpose of holding open a gutter when the umbrella is opened may be adopted. The manner in which I prefer to affix them to the ribs is shown separately at figs. 2 and 3. The end portion only of the rib is shown in these figures.

At Figure 2 the rib is shown bent to the form it would assume when the umbrella, of which it forms a part, is opened, so as to show the end of the strip of metal $a$ standing out from the rib and holding the gutter open.

At Figure 3 the rib is shown as it appears when the umbrella is closed.

The fabric forming the covering of the umbrella and the gutter are shown by dotted lines. In the arrangement shown the end of the rib has affixed to it a strip of sheet metal, $b$, one end of such strip being bent around and closed over onto the end of the rib, the other end being fitted with a tip to correspond with the other tips of the umbrella. Another strip having a bent shoulder is then bent round and closed on near the point.

Strips of metal $a$, to lead backward along the rib of an umbrella, might similarly be fixed to the rib at any desired distance from its tip end, and I prefer that the strips $a$ should be covered over with fabric similar to that composing the covering of the umbrella; but they might be left uncovered, if desired.

I have in the drawing shown the strips $a$ applied to solid ribs. They might, however, be applied to ribs known as the paragon ribs, or to ribs of other section.

At Figure 4 is shown a longitudinal section of a portion of the frame of an umbrella or sunshade, such as shown at fig. 1. One of the ribs has strips $b$ and $a$ attached to its tip end, while the rib on the opposite side is a plain rib. The tip ends of all the ribs are set inward, as shown by the drawing, so as to cause their tips to lie close up to the stick of the umbrella, and also to cause the shoulders of the strips $a$ to project less when the umbrella or sunshade is rolled up than they would without such bend.

The runner $c$ of the umbrella or sunshade, shown at fig. 4, is also strengthened around the edges of the longitudinal slot $c^1$, which is formed in it.

With runners as ordinarily constructed the metal of the tube of the runner is often torn by the side of the slot in the runner being forced against the spring catch at the time when the umbrella is being rolled up.

The end of the slot is also frequently torn by reason of its striking against the spring catch, by which the runner is secured.

According to my invention I strengthen the sides of the slot which are thus liable to be torn open, by soldering or fixing to them a strengthening piece of metal.

The manner in which I prefer to strengthen the edges of the slot is by fixing around them a bent strip of steel wire. This I effect as shown at Figures 5, 6, 7, 8, and 9.

A runner which has no slot cut in it is first brought by means of suitable dies, to the form shown at figs. 5. The upper part of the bulge $a$ is then with one or two strokes of a file slightly reduced in thickness, and a slit is made along it by the point of a knife; the runner is thus brought to the shape shown at fig. 6. Afterward the slit is opened out by a flat chisel or like instrument, to bring it to the shape shown at figs. 7.

A bent strip of steel-wire, such as shown at Figure $7^\times$, previously hardened and tempered, is then placed around the slot, and the pieces of metal $a\ a$ standing up along the longer sides of the slot are, by a light hammer, turned over roughly to overlap the wire, as shown at figs. 8. Afterward the pieces of metal $a$ are closed neatly over the wire, as shown at figs. 9, by bringing a die to bear upon them while the runner is supported upon a mandrel.

Other methods of strengthening runners along the side or along a portion of the side of their longitudinal slot, by fixing a soldering to it a strengthening piece of metal may be adopted; as for example Figures 10 and 11 show how the side of the slot $a$ in the runner of an umbrella may be strengthened by additional pieces of metal $b\ b$ soldered to it.

Figures 12, 13, and 14 show how both the sides and end of the slot may be thus strengthened.

Figure 15 shows how the side of the slot may be strengthened by turning back the metal which has to be removed to the side of the slot. I prefer that in this case the beading $c$ should be made to overlap the end of the strip of metal $b$ which is so turned back.

Figure 16 shows how the slot may be strengthened around all its sides by applying additional metal, marked $b\ b$, to it.

A short tube, of metal, $b$, is first formed with a flange all around one of its ends, as shown at fig. $15^\times$. The tube is then passed through the slot and is turned or riveted over to cause it to embrace the sides of the slot.

I claim—

1. The constructing an umbrella with a gutter, which is opened, and held open, (at the time when the umbrella is opened,) by means of strips of metal or springs, connected at one end to the ribs, and at the other end to the fabric forming the gutter, as herein described.

2. The umbrella runner, constructed with the sides of its slot strengthened by doubling the metal, substantially as before set forth.

JAMES WILLIS.

Witnesses:
G. F. WARREN, } Both of No. 17 Gracechurch
THOS. LAKE, } street, London.
JOHN HARRISON, Notary Public, London.